(12) United States Patent
Dyess et al.

(10) Patent No.: US 11,747,848 B2
(45) Date of Patent: *Sep. 5, 2023

(54) DYNAMIC LOAD CURTAILMENT SYSTEM AND METHOD

(71) Applicant: GridPoint, Inc., Reston, VA (US)

(72) Inventors: Danny K. Dyess, Roanoke, VA (US); Arnie J. Tamagni, Troutville, VA (US); Mark W. Vinson, Roanoke, VA (US)

(73) Assignee: Gridpoint, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,282

(22) Filed: Nov. 24, 2020

(65) Prior Publication Data
US 2021/0318707 A1 Oct. 14, 2021

Related U.S. Application Data

(63) Continuation of application No. 15/842,227, filed on Dec. 14, 2017, now Pat. No. 10,866,609, which is a
(Continued)

(51) Int. Cl.
*G05F 1/66* (2006.01)
*F24F 11/30* (2018.01)
(Continued)

(52) U.S. Cl.
CPC ............... *G05F 1/66* (2013.01); *F24F 11/30* (2018.01); *F24F 11/47* (2018.01); *F24F 11/56* (2018.01);
(Continued)

(58) Field of Classification Search
None
See application file for complete search history.

(56) References Cited

U.S. PATENT DOCUMENTS 5,543,667 A    8/1996   Shavit et al.
10,866,609 B2 * 12/2020  Dyess ..................... G05F 1/66
(Continued)

*Primary Examiner* — Ryan A Jarrett
(74) *Attorney, Agent, or Firm* — Bookoff McAndrews, PLLC

(57) ABSTRACT

A system and method are disclosed for dynamically learning the optimum energy consumption operating condition for a building and monitor/control energy consuming equipment to keep the peak demand interval at a minimum. The dynamic demand limiting algorithm utilized employs two separate control schemes, one for HVAC loads and one for non-HVAC loads. Separate operating parameters can be applied to the two types of loads and multiple non-HVAC (control zones) loads can be configured. The algorithm uses historical peak demand measurements in its real-time limiting strategy. The algorithm continuously attempts to reduce peak demand within the user configured parameters. When a new peak is inevitable, the algorithm strategically removes and/or introduces loads in a fashion that limits the new peak magnitude and places the operating conditions within the user configured parameters. In an embodiment, the algorithm that examines the previous seven days of metering information to identify a peak demand interval. The system then uses real-time load information to predict the demand peak of the upcoming interval, and strategically curtails assigned loads in order to limit the demand peak so as not to set a new peak.

20 Claims, 3 Drawing Sheets

Related U.S. Application Data continuation of application No. 14/513,374, filed on Oct. 14, 2014, now Pat. No. 9,880,577, which is a continuation of application No. 13/425,195, filed on Mar. 20, 2012, now Pat. No. 8,862,280.

(60) Provisional application No. 61/496,422, filed on Jun. 13, 2011, provisional application No. 61/496,431, filed on Jun. 13, 2011.

(51) Int. Cl.

| | | |
|---|---|---|
| *F24F 11/64* | (2018.01) | |
| *F24F 11/47* | (2018.01) | |
| *F24F 11/62* | (2018.01) | |
| *F24F 11/65* | (2018.01) | |
| *F24F 11/56* | (2018.01) | |
| *G05B 15/02* | (2006.01) | |
| *G06N 5/04* | (2023.01) | |
| *G05B 19/048* | (2006.01) | |
| *F24F 11/63* | (2018.01) | |
| *F24F 11/46* | (2018.01) | |
| *F24F 140/00* | (2018.01) | |

(52) U.S. Cl.
CPC .............. *F24F 11/62* (2018.01); *F24F 11/63* (2018.01); *F24F 11/64* (2018.01); *F24F 11/65* (2018.01); *G05B 15/02* (2013.01); *G05B 19/048* (2013.01); *G06N 5/04* (2013.01); *F24F 11/46* (2018.01); *F24F 2140/00* (2018.01); *G05B 2219/2614* (2013.01)

(56) References Cited

U.S. PATENT DOCUMENTS

2008/0177423 A1 7/2008 Brickfield et al.
2011/0172845 A1 7/2011 Kulyk et al.

\* cited by examiner

DYNAMIC LOAD CURTAILMENT SYSTEM AND METHOD

This application is a continuation of and claims the benefit of priority to U.S. patent application Ser. No. 15/842,227, filed Dec. 14, 2017, which is a continuation of and claims the benefit of priority to U.S. patent application Ser. No. 14/513, 374, filed on Oct. 14, 2014, now U.S. Pat. No. 9,880,577, which is a continuation of and claims the benefit of priority to U.S. patent application Ser. No. 13/425,195 entitled "Dynamic Load Curtailment System And Method" filed Mar. 20, 2012, now U.S. Pat. No. 8,862,280, which claims priority to Provisional Patent Application No. 61/496,422, entitled "System and Method of Controlling Setback Recovery of a Power Consuming Device," filed Jun. 13, 2011, and Provisional Patent Application No. 61/496,431, entitled "System and Method of Controlling the Setback of a Power Consuming Device," filed Jun. 13, 2011, the entire disclosures of which are incorporated herein by reference.

FIELD

The present invention relates in general to the field of energy management, and in particular to dynamic load curtailment in an energy management system.

BACKGROUND

Load curtailment adjusts energy consumption down to a contextual target that is calculated by a load curtailment algorithm based on the historical consumption of a building. Dynamic load curtailment tunes the building, constantly seeking the lowest loads possible. Over time, the load falls while the building finds its new equilibrium. Most applications that curtail loads operate on a schedule or threshold basis. These systems require a lot of tuning to get the building to operate as efficiently as possible and even require retuning in some cases based on seasonal changes. If not tuned, the building either isn't curtailing the right amount of energy or is curtailing too much, which results in occupant disruption.

SUMMARY

The system and method of the invention utilizes an algorithm to dynamically learn the optimum energy consumption operating condition for a building and monitor/control energy consuming equipment to keep the peak demand to a minimum. This algorithm allows for buildings to dynamically operate in the most efficient manner while being transparent to the building occupants.

In an embodiment, the dynamic demand limiting (load curtailment) algorithm employs two separate control schemes, one for HVAC loads and one for non-HVAC loads. Separate operating parameters can be applied to the two types of ads and multiple (e.g., up to ten) non-HVAC control zone loads can be configured.

The algorithm uses historical peak demand measurements in its real-time limiting strategy. The algorithm continuously attempts to reduce peak demand within the user configured parameters, such as minimum and maximum temperature set points. When a new peak is inevitable, the algorithm can strategically remove and/or introduce loads in a fashion that limits the new peak magnitude and places the operating conditions within the user configured parameters. All curtailment actions are logged within the energy management controller. These logs include relevant data such as the date and time of curtailment and the load that was curtailed.

In an embodiment, the disclosed system and method utilizes an algorithm that examines the previous seven days of metering information to identify a peak interval in which it uses a percentage such as 95% of that peak interval as its target or a recent occupied average load in which it uses a percentage such as 105% of that average load as its target. The system then uses real-time load information to predict the demand peak of the upcoming interval, and strategically curtails assigned loads in order to limit the demand peak so as not to set a new peak. In this manner, an automated tuning operation is created and the building operates with improved efficiency.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings.

Figure 1:
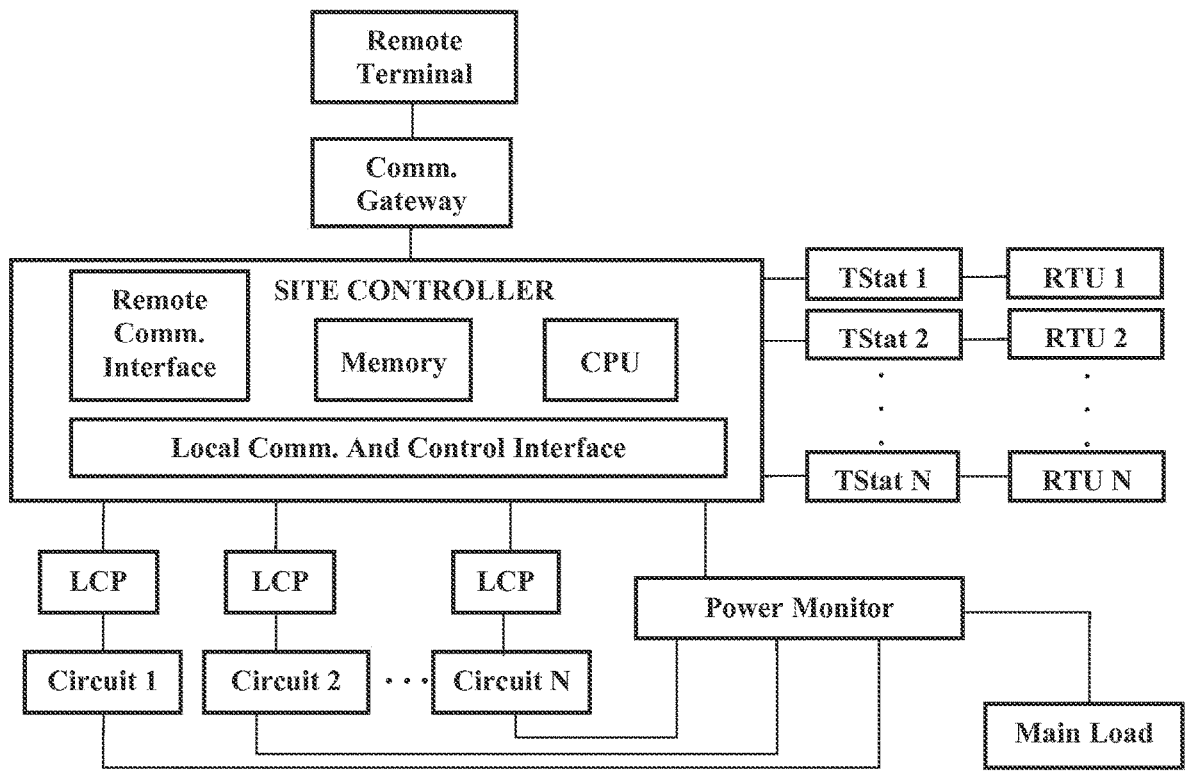
FIG. 1 shows a schematic block diagram illustrating an energy management system for practicing the method of the invention.

FIG. 1 shows a schematic block diagram illustrating an exemplary embodiment of an energy management system for practicing the method of the invention. A site controller with embedded control algorithms controls multiple electrical loads on circuits 1 through N via light control panels (LCPs). The site controller is typically wired to common voltages at an electrical distribution panel of a commercial or residential building facility via a main line meter (power monitor). The site controller includes memory and a CPU for respectively storing and implementing energy management algorithms in accordance with the invention, discussed below. The algorithms accept real-time power and environmental variable measurements (including readings from thermostats TStat 1 through TStat N) as inputs and determine how to control the power delivered on the circuits 1 through N and to control set points and other configurable settings such as enabling/disabling compressor stages on TStat 1 through TStat N. The site controller may include a power supply and one or more wired or wireless local communication and control interfaces for controlling Circuit 1 through Circuit N and TStat 1 through TStat N. Thermostats TStat 1 through TStat N provide temperature and humidity inputs to the site controller, and output control signals to roof-top units RTU 1 through RTU N. A communication interface provides bi-directional communication with a communication gateway, which in turn manages wired or wireless communications with a remote terminal.

One or more power monitors are coupled to the site controller either via wired or wireless connection. The power monitor includes hardware and firmware to provide sampling functionality, including multiple analog-to-digital converters for multi-channel fast waveform sampling of inputs such as current and voltage. The power monitor includes wired or wireless communication interfaces, current and voltage monitoring interfaces, memory, CPU, and may also include a power supply.

In an alternative embodiment, the A/D converters and voltage and current monitoring interfaces of the power monitor may be integrated within the site controller to provide voltage and current monitoring without the use of an external power monitor. Further, additional environmental sensors, such as outdoor temperature sensors, may be monitored by the system. In yet another alternative embodiment, the control algorithms may be embedded and executed within the power monitor itself.

The current and voltage monitoring interfaces connect between the power circuits being monitored and the A/D converter. Each channel may be connected to a separate power circuit to monitor the flow of current through the circuit. The connection is made with a current transformer at both a supply (i.e., hot) line and a return (i.e., neutral) line of the power circuit, which provides a waveform signal that is representative of the current flow at the connection point.

Figure 2:
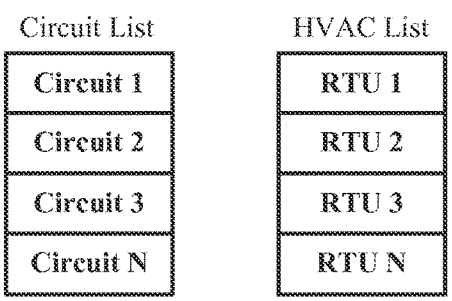
FIG. 2 shows two charts illustrating an example of circuit lists and HVAC lists.

FIG. 2 shows two charts illustrating an example of circuit configuration lists and HVAC configuration lists. Loads can be disabled by the system in the order as listed therein, or as otherwise discussed in further detail below. Separate lists are stored for HVAC loads and non-HVAC loads.

Figure 3:
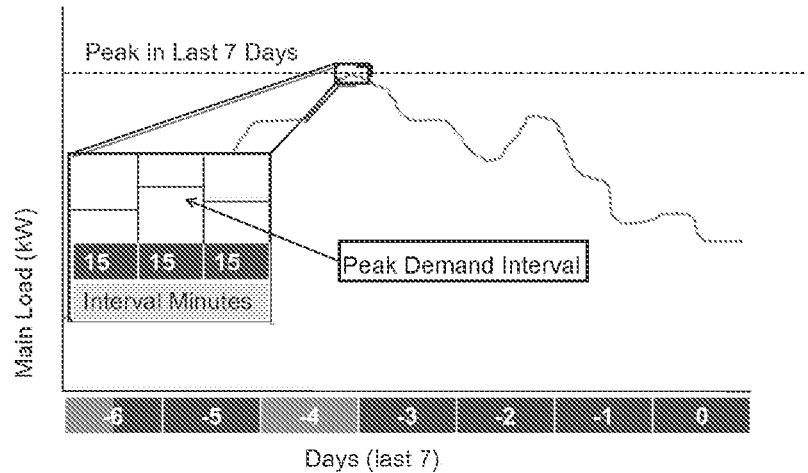
FIG. 3 shows a graph of demand over fifteen minute intervals to illustrate methods for finding peaks for calculations.

FIG. 3 shows a graph illustrating demand over fifteen minute intervals. The graph line is exaggerated for clarity to show some distinct peaks, and the actual load line would be much flatter. A dynamic load curtailment algorithm constantly monitors the last seven days for the peak energy usage (in kw). If you imagine this graph in motion, it will constantly move to the left. At the point in time at which this chart was generated, the peak is at the end of day −4. Each day, that peak will move to the left, to the end of day −5, then −6, then it will "fall off" the graph to the left. In the mean time, the "new peak" (at the end of day −2) moves to the left also. When the "old peak" falls off the graph to the left, the system uses the "new peak." Eventually, that new peak will fall off the graph to the left and be replaced with a new one, and so on. The number of days the algorithm uses to determine the peak energy usage is configurable and can be more or less than seven. Moreover, the billing intervals are configurable and can set to more or less than 15 minutes. The next FIG. shows what happens to the target load when the "old peak" falls off the left side of this chart and a "new peak" appears.

Figure 4:
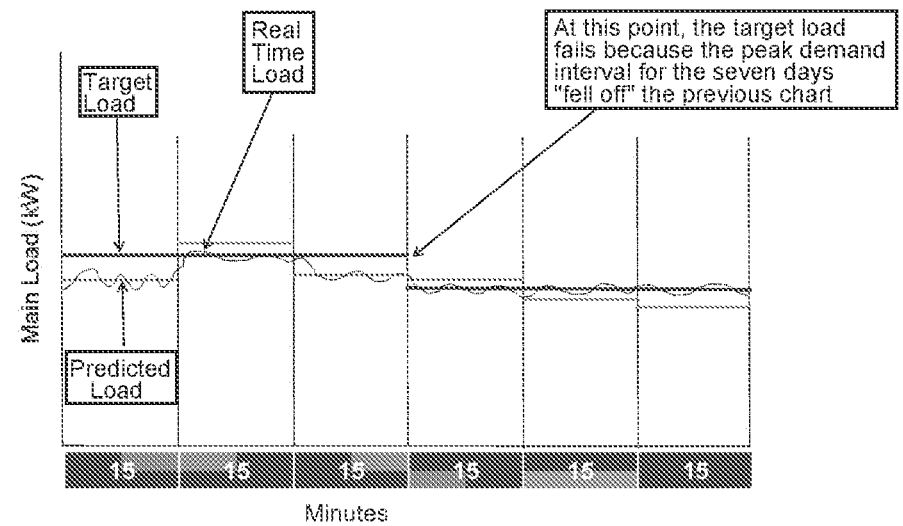
FIG. 4 shows a graph of demand over fifteen minute intervals to illustrate prediction of load over a time interval.

With reference to FIG. 4, at the same time that the system is looking at the last seven days for the peak, it is also predicting the load for the next billing interval, which is typically 15 minutes. The controller has enough information available to it to make the prediction accurately for the average load in the next 15 minutes. The load is the average for the interval, not any one single point in the load. Thus, while the real time load bounces around the predicted load, the algorithm isn't concerned with outlying dips and spikes, only in a way to drive the load down for the billing interval.

Figure 5:
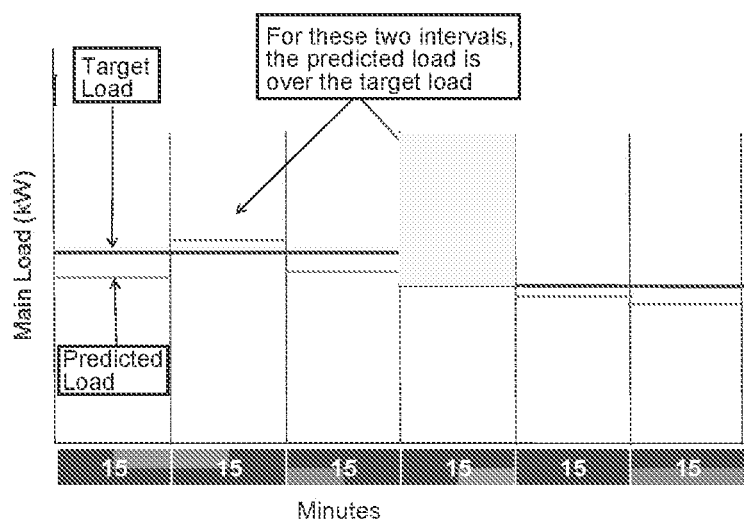
FIG. 5 shows a graph of demand over fifteen minute intervals to illustrate sending intervals into curtailment.

FIG. 5 shows a graph of demand over fifteen minute intervals to illustrate sending intervals into curtailment. In this graph, two intervals have a predicted load over the target load. Those intervals begin curtailment depending on configuration of the system.

The actions used to curtail load are (a) de-energizing of circuits and (b) reduction of consumption of HVAC within comfort limits. To de-energize circuits, the system turns off predefined circuits within predefined limits. These are "nice to have" circuits, like spotlights on the exterior of building or a wall heater. Reduce consumption of HVAC within comfort limits by either turning off stage two (one of two compressors in the RTU) or tuning the set point to reduce cycles.

In accordance with the invention, total facility load is monitored, for example via the main load power monitor, and predictions for total facility demand are calculated and compared to a target value for total facility KW demand. The demand interval should be configured as that of the customer's billing tariff. Projected load is determined based on real-time load information and other information such as typical equipment run-times and equipment operational schedules. When projected demand indicates that the demand target will be exceeded for the current interval, set points or active stages for individual HVAC units are incrementally changed in an effort to reduce the associated load as needed to keep the total facility demand from exceeding the target limit. Control zones can also be de-activated in order to keep the target demand from being exceeded.

HVAC units can be curtailed by either (a) turning off only stage 2 or (b) increasing or decreasing the cooling or heating set point, respectively, by several degrees (configurable). The curtailment option to be applied for a particular HVAC unit is configurable, along with the curtailment priority order. Curtailment priority order can be configured to rotate to ensure some runtime for each unit. In addition to the minimum on-time and off-time requirements enforced by the controlling thermostats, thermostat on and off time requirements are enforced by this control scheme as well.

Control zones can be curtailed by de-energizing their circuits for a configurable amount of time during the demand interval. This ensures that these loads will always run for a minimal amount of time. All control zones are the lowest priority in this control scheme and thus will be the first loads to be curtailed. Once all available control zones have been curtailed, only then would HVAC units be altered in accordance with configured run times. Only one load will be changed (control zone and/or HVAC units) per minute. Alternatively, other time intervals for changing loads could be configured.

Curtailment by Turning off Only Stage 2

This control scheme is not synchronized with the demand interval. The sequence of operation is as follows:

1) At any time during the demand interval, these HVAC loads are curtailed in a prioritized "staggered" fashion (one at a time per minute) by immediately turning off only stage 2 when the following conditions occur:
 a) Predicted total facility demand exceeds the target total facility KW value;
 b) Zone temperature does not exceed the normal target zone temperature plus the predefined curtailment offset unless the system is in recovery in which case the zone temperature will not exceed unoccupied settings;
 c) Minimum configured thermostat on time has been satisfied.

2) Once an HVAC load has been curtailed, it will continue to be curtailed for at least the configured thermostat off time (regardless of zone temperature).

3) These HVAC loads will remain in curtailment, after the configured thermostat off time, as long as the predicted total facility demand exceeds the target total facility KW value (regardless of zone temperature).

4) When predicted total facility demand becomes less than the target total facility KW value, stage 2 of these units is re-enabled in a prioritized "staggered" fashion—if the thermostat off time has been satisfied.

Curtailment by Changing Set Points

This control scheme is not synchronized with the demand interval. The sequence of operation is as follows:

1) At any time during the demand interval, these HVAC loads will be curtailed in a prioritized "staggered" fashion (one at a time per minute) by immediately increasing or decreasing the cooling or heating set point, respectively, by the number of degrees equal to the curtailment offset (configurable per unit) unless the system is in recovery in which case the thermostat will be set to unoccupied settings when the following conditions occur:
 a) Predicted total facility demand exceeds the target total facility KW value;
 b) Minimum thermostat on time has been satisfied.

2) Once an HVAC load has been curtailed, it will continue to be curtailed for at least the configured thermostat off time (regardless of zone temperature).

3) The HVAC load will remain in curtailment, after the configured thermostat off time, as long as the predicted total facility demand exceeds the target total facility KW value.

4) When predicted total facility demand becomes less than the target total facility KW value, these HVAC units are returned to normal set point values in a prioritized "staggered" fashion—if the configured thermostat off time has been satisfied.

Curtailment by De-Energizing Loads

This form of curtailment cuts off or decreases power to the loads. The sequence of operation is as follows:

1) At the beginning of each demand interval, these loads are enabled to run for a predefined minimum runtime (per interval).

2) After the minimum runtime has been satisfied, these load are immediately disabled for the remainder of the interval if the predicted total facility demand exceeds the target facility KW value. The loads will be disabled in the order as listed in the configuration.

Determination of Total Facility Demand Target

The total facility demand target can be determined by either (a) a predefined table of monthly target values (12 values—one for each calendar month), or (b) a dynamically calculated target value. With dynamic calculation of total facility target KW, controllers will automatically and dynamically calculate the target total facility KW value such that the target total facility KW is the greater of:

1. 0.95×Recent Total Facility Demand Peak where Recent Total Facility Demand Peak=the highest total facility demand value for the previous seven (7) days (determined dynamically).

2. 1.05×Recent Occupied Average Total Facility Load, where Recent Occupied Average Total Facility Load=the average value of total facility load during occupied hours for the previous seven (7) days (determined dynamically). Alternatively, either of Recent Total Facility Demand Peak or Recent Occupied Average Total Facility Load can be used atone to calculate the target total facility KW value. Moreover, a configurable number of previous days can be used to derive these quantities.

Target total facility KW is calculated at the beginning of each demand interval. The goal is to achieve a stable control scheme that automatically and gradually adjusts to the best achievable total facility demand deduction as total facility load characteristics vary over time.

The 0.95 and 1.05 factors (above) on the dynamic calculations are configurable and may need to be adjusted to achieve optimum stable demand reduction. The lower the setting, the faster the system will react. The higher the setting, the slower the system will react.

The present invention has been described above with reference to algorithms and operational illustrations of methods and devices to dynamically curtail load in an energy management system. It is understood that each step of the algorithm or operational illustrations may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implement the functions/acts specified. Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. in some alternate implementations, the steps may occur out of the order noted in the operational illustrations.

The load curtailment algorithms taught above may operate in combination with other energy management algorithms, including algorithms for HVAC recovery, HVAC setback, humidity control, and demand control ventilation. Such algorithms tune buildings to reduce power consumption while considering comfort. The algorithms may run on the site controller illustrated in FIG. 1 or in the power monitor, and discussed above. The algorithms may be configured to work together as follows. The load curtailment algorithm described above adjusts consumption down to contextual target that it calculates based on the historical consumption of the building. An HVAC Recovery algorithm efficiently returns buildings to occupied temperature settings, as disclosed in Provisional Patent Application No. 61/496,422, entitled "System and Method of Controlling Setback Recovery of a Power Consuming Device," filed Jun. 13, 2011, and expressly incorporated herein in its entirety. An HVAC Setback algorithm efficiently returns buildings to unoccupied temperature settings, as disclosed in Provisional Patent Application No. 61/496,431, entitled "System and Method of Controlling the Setback of a Power Consuming Device, filed Jun. 13, 2011, and expressly incorporated herein in its entirety. A Humidity Control algorithm uses HVAC systems to remove humidity from indoor air. A Demand Control Ventilation (DCV) algorithm draws external air into the system to affect air quality. Because the algorithms run on the same controller, the system can prevent conflicts between working algorithms by choosing the most energy efficient output of the algorithms. Each algorithm has its own comfort limits, so the most energy efficient output already considers comfort of a building's occupants.

While the invention has been particularly shown and described with reference to a preferred embodiment thereof, it will be understood by those skilled in the art that various changes in form and details may be made therein without departing from the spirit and scope of the invention.

What is claimed is:

1. A method for dynamically monitoring and controlling energy consuming equipment to limit a peak total demand, comprising:
   utilizing a dynamic demand-limiting algorithm that employs a control scheme for a plurality of loads;
   calculating, using historical peak demand measurements, a predicted total peak demand for the plurality of loads as a greater of:
   a first proportion times a highest demand peak among the historical peak demand measurements, and
   a second proportion times an average total demand among the historical peak demand measurements; and
   controlling the plurality of loads according to the dynamic demand-limiting algorithm to reduce the predicted total peak demand.

2. The method according to claim 1, wherein when a new peak is predicted, loads among the plurality of loads are introduced in a fashion that limits a new peak magnitude and places operating conditions of the plurality of loads within user configured parameters.

3. The method according to claim 1, wherein the first and second proportions are configurable.

4. The method according to claim 1, wherein a duration of a historical time interval including the historical peak demand measurements is configurable.

5. The method according to claim 1, wherein controlling the plurality of loads further comprises:
   identifying each load among the plurality of loads that can be modified as an identified load; and
   establishing a modification limit for each identified load.

6. The method according to claim 5, wherein one identified load is an energy consuming device, and the modification limit includes a permissible time period for deactivating or modifying a performance of the energy consuming device.

7. The method according to claim 5, wherein one identified load is an HVAC unit, and the modification limit includes a permissible time period for deactivating a stage or a component of the HVAC unit.

8. The method according to claim 1, wherein the average total demand is specific to an occupied portion of one or more historical time intervals.

9. A system for dynamically monitoring and controlling energy consuming equipment to limit a peak total demand, the system comprising:
   a data storage device storing instructions for monitoring and controlling energy consuming equipment to limit a peak total demand in an electronic storage medium; and
   a processor configured to execute the instructions to perform a method including:
   utilizing a dynamic demand-limiting algorithm that employs a control scheme for a plurality of loads;
   calculating, using historical peak demand measurements, a predicted total peak demand for the plurality of loads as a greater of:
   a first proportion times a highest demand peak among the historical peak demand measurements, and
   a second proportion times an average total demand among the historical peak demand measurements; and
   controlling the plurality of loads according to the dynamic demand-limiting algorithm to reduce the predicted total peak demand.

10. The system of claim 9, wherein when a new peak is predicted, loads among the plurality of loads are introduced in a fashion that limits a new peak magnitude and places operating conditions of the plurality of loads within user configured parameters.

11. The system of claim 9, wherein controlling the plurality of loads further comprises:
    identifying each load among the plurality of loads that can be modified as an identified load; and
    establishing a modification limit for each identified load.

12. The system of claim 11, wherein one identified load is an energy consuming device, and the modification limit includes a permissible time period for deactivating or modifying a performance of the energy consuming device.

13. The system of claim 11, wherein one identified load is an HVAC unit, and the modification limit includes a permissible time period for deactivating a stage or a component of the HVAC unit.

14. The system of claim 9, wherein the average total demand is specific to an occupied portion of one or more historical time intervals.

15. A non-transitory machine-readable medium storing instructions that, when executed by a computing system, causes the computing system to perform a method for monitoring and controlling energy consuming equipment to limit a peak total demand, the method including:
    utilizing a dynamic demand-limiting algorithm that employs a control scheme for a plurality of loads;
    calculating, using historical peak demand measurements, a predicted total peak demand for the plurality of loads as a greater of:
    a first proportion times a highest demand peak among the historical peak demand measurements, and
    a second proportion times an average total demand among the historical peak demand measurements; and
    controlling the plurality of loads according to the dynamic demand-limiting algorithm to reduce the predicted total peak demand.

16. The non-transitory machine-readable medium of claim 15, wherein when a new peak is predicted, loads among the plurality of loads are introduced in a fashion that limits a new peak magnitude and places operating conditions of the plurality of loads within user configured parameters.

17. The non-transitory machine-readable medium of claim 15, wherein controlling the plurality of loads further comprises:
    identifying each load among the plurality of loads that can be modified as an identified load; and
    establishing a modification limit for each identified load.

18. The non-transitory machine-readable medium of claim 17, wherein one identified load is an energy consuming device, and the modification limit includes a permissible time period for deactivating or modifying a performance of the energy consuming device.

19. The non-transitory machine-readable medium of claim 17, wherein one identified load is an HVAC unit, and the modification limit includes a permissible time period for deactivating a stage or a component of the HVAC unit.

20. The non-transitory machine-readable medium of claim 15, wherein the average total demand is specific to an occupied portion of one or more historical time intervals.

* * * * *